US009838577B2

(12) United States Patent
Tompkins et al.

(10) Patent No.: US 9,838,577 B2
(45) Date of Patent: *Dec. 5, 2017

(54) TRACKING CAMERA PIVOT MECHANISM (71) Applicant: Oculus VR, LLC, Menlo Park, CA (US)

(72) Inventors: Glen Jason Tompkins, Woodinville, WA (US); Simon Morris Shand Weiss, Redwood City, CA (US); Peter Wesley Bristol, Seattle, WA (US); Enric Vial Roig, Seattle, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,388

(22) Filed: Feb. 24, 2017

(65) Prior Publication Data

US 2017/0163854 A1    Jun. 8, 2017

Related U.S. Application Data

(63) Continuation of application No. 14/935,295, filed on Nov. 6, 2015, now Pat. No. 9,686,453.

(51) Int. Cl.
*H04N 5/225* (2006.01)
*F16M 11/22* (2006.01)
*G03B 17/56* (2006.01)
*F16M 11/18* (2006.01)
*F16M 11/10* (2006.01)

(52) U.S. Cl.
CPC .......... *H04N 5/2252* (2013.01); *F16M 11/10* (2013.01); *F16M 11/18* (2013.01); *F16M 11/22* (2013.01); *G03B 17/561* (2013.01)

(58) Field of Classification Search
CPC .... H04N 5/2251–5/2252; G03B 17/56; G03B 17/561; F16M 11/04; F16M 11/06; F16M 11/08; F16M 11/10; F16M 11/12
See application file for complete search history.

(56) References Cited

U.S. PATENT DOCUMENTS

| 1,915,835 A | 6/1933 | Pajeau et al. |
|---|---|---|
| 4,593,877 A | 6/1986 | van der et al. |
| 5,271,196 A | 12/1993 | Fanti et al. |
| 5,381,176 A | 1/1995 | Tanabe et al. |
| 5,384,609 A | 1/1995 | Ogawa et al. |
| 5,490,599 A | 2/1996 | Tohidi et al. |

(Continued)

OTHER PUBLICATIONS

Blain, L., "'Ancient' Oculus Rift concepts leak new controller and front-facing camera," GamesRadar+, dated Jun. 9, 2015, 8 pages.

(Continued)

*Primary Examiner* — Daniel M Pasiewicz
(74) *Attorney, Agent, or Firm* — Perkins Coie LLP (57) ABSTRACT

Pivot mechanisms for tracking cameras are disclosed herein. A tracking camera assembly includes a camera head having a housing and a pivot joint disposed within the housing. The pivot joint fitting is configured to rotate with respect to the housing. A cable is in electrical communication with the camera head and is fixedly coupled to the pivot joint fitting and extends away from the camera head. A stand pole is fixedly coupled to the pivot joint fitting and extends away from the camera head.

20 Claims, 9 Drawing Sheets

(56) References Cited

U.S. PATENT DOCUMENTS

| | | | |
|---|---|---|---|
| D377,032 S | 12/1996 | Morooka et al. | |
| D403,338 S | 12/1998 | Dunn et al. | |
| 5,954,310 A | 9/1999 | Soldo et al. | |
| 6,056,450 A | 5/2000 | Walling | |
| 6,311,641 B1 | 11/2001 | Johnson | |
| 6,411,332 B1 | 6/2002 | Whitby et al. | |
| D509,842 S | 9/2005 | Ou et al. | |
| D511,352 S | 11/2005 | Oliver et al. | |
| D545,858 S | 7/2007 | Li et al. | |
| D548,763 S | 8/2007 | Boris et al. | |
| 7,267,496 B2 | 9/2007 | Wesselink et al. | |
| D569,887 S | 5/2008 | Feng et al. | |
| 7,612,825 B2 | 11/2009 | Lapstun et al. | |
| 7,690,851 B2 | 4/2010 | Sugiyama et al. | |
| D636,421 S | 4/2011 | Sagen et al. | |
| D640,721 S | 6/2011 | Satine et al. | |
| D645,891 S | 9/2011 | Seo et al. | |
| 8,661,890 B1 | 3/2014 | Raithel et al. | |
| 8,668,395 B2 | 3/2014 | Mameda et al. | |
| 8,730,387 B2 * | 5/2014 | Cordes | H04N 7/142 348/373 |
| D729,296 S | 5/2015 | Shelton | |
| 9,686,453 B2 | 6/2017 | Tompkins et al. | |
| 2005/0151846 A1 | 7/2005 | Thornhill et al. | |
| 2010/0155549 A1 | 6/2010 | Robinson et al. | |
| 2011/0049060 A1 | 3/2011 | Uy et al. | |
| 2011/0108689 A1 * | 5/2011 | Dorris | F16M 11/041 248/221.12 |
| 2012/0120236 A1 | 5/2012 | Xiao et al. | |
| 2013/0215322 A1 | 8/2013 | Haler et al. | |
| 2016/0077410 A1 | 3/2016 | Lytle | |
| 2017/0104899 A1 | 4/2017 | Bristol et al. | |
| 2017/0134621 A1 | 5/2017 | Tompkins et al. | |

OTHER PUBLICATIONS

Examiner's Report dated Mar. 4, 2016 for Australian Application No. 366593, of Picket, D., et al., filed Dec. 8, 2015.
Examiner's Report dated Mar. 4, 2016 for Australian Application No. 366594, of Picket, D., et al., filed Dec. 8, 2015.
Final Office Action dated Nov. 22, 2016, for U.S. Appl. No. 14/877,833 by Bristol, P., et al., filed Oct. 7, 2015.
First Examination Report dated Feb. 4, 2016 for Israeli Application No. 57745, of Picket, D., et al., filed Nov. 26, 2015.
First Examination Report dated Mar. 18, 2016 for Indian Design Application No. 278181, of Picket, D., et al., filed Dec. 9, 2015.
First Examination Report dated Mar. 18, 2016 for Indian Design Application No. 278192, of Picket, D., et al., filed Dec. 9, 2015.
First Examiner's Report dated Apr. 8, 2016 for Canadian Application No. 167,442, filed Jul. 6, 2015.
First Examiner's Report dated Nov. 19, 2015 for Canadian Application No. 163,155, filed Jul. 6, 2015.
Lang, B., "Front-facing Camera and New Positional Tracker for Oculus Rift Shown in Leak," Road to VR, Jun. 9, 2015, 2 pages.
Lang, B., "Oculus Rift Input Controller Revealed in Leaked 'Placeholder Concept'", Road to VR, dated Jun. 9, 2015, 2 pages.
Non-Final Office Action dated Aug. 16 2016, for U.S. Appl. No. 14/877,833 by Bristol, P., et al., filed Oct. 7, 2015.
Non-Final Office Action dated Jan. 30, 2017, for U.S. Appl. No. 14/935,295 by Tompkins, G., et al., filed Nov. 6, 2015.
Notice of Preliminary Rejection dated Oct. 9, 2016 for Korean Application No. 30-2015-0063431, of Pickett, D., et al., filed Dec. 11, 2015.
Orland, K., "Leaked images could point to Oculus controller, final Rift design," ars Technica, dated Jun. 10, 2015, 2 pages.
Second Examiner's Report dated Mar. 15, 2016 for Canadian Application No. 163,155, filed Jul. 6, 2015.
U.S. Appl. No. 14/877,833 by Bristol, P., et al., filed Oct. 7, 2015.
U.S. Appl. No. 14/935,295 by Tompkins, G., et al., filed Nov. 6, 2015.
U.S. Appl. No. 29/529,907 by Pickett, D., et al., filed Jun. 11, 2015.
Notice of Allowance dated Mar. 23, 2017, for U.S. Appl. No. 14/935,295 by Tompkins, G., et al., filed Nov. 6, 2015.
Restriction Requirement dated May 30, 2017 for U.S. Appl. No. 29/529,907 by Pickett, D., et al., filed Jun. 11, 2015.
Non-Final Office Action dated Jul. 27, 2017 for U.S. Appl. No. 29/529,907 by Pickett, D., et al., filed Jun. 11, 2015.
U.S. Appl. No. 29/610,210 by Pickett, D., et al., filed Jul. 10, 2017.

* cited by examiner

TRACKING CAMERA PIVOT MECHANISM

CROSS-REFERENCE TO RELATED APPLICATIONS

This application is a continuation application of U.S. patent application Ser. No. 14/935,295, filed on Nov. 6, 2015, and titled TRACKING CAMERA PIVOT MECHANISM, which is incorporated herein by reference in its entirety.

TECHNICAL FIELD

This patent application is directed to tracking cameras and, more specifically, to movable tracking cameras.

BACKGROUND

Tracking cameras are configured to move to follow a target or to capture desired fields of view over time. Mounting hardware must enable controlled movement of the camera in one or more dimensions. During such movement of the camera, any cables extending from the camera can snag and exert tension on the camera head, thereby impeding fluid and precise movement of the tracking camera. Accordingly, there is a need for a hardware that permits movement of the camera head while reducing the risk of cables exerting undue tension on the camera head.

BRIEF DESCRIPTION OF THE DRAWINGS

Embodiments of the tracking camera pivot mechanism introduced herein may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

DETAILED DESCRIPTION

Overview

A tracking camera assembly having a pivot mechanism is disclosed. The camera assembly includes a camera head having a housing and a pivot joint disposed within the housing. The pivot joint fitting can rotate with respect to the housing. A cable is electrically connected to the camera head and fixed to the pivot joint fitting. A stand pole is also fixed to the pivot joint fitting and extends away from the camera head. A cable clamp retains the cable in the fitting thereby preventing any movement of the cable from moving the camera head. In some embodiments, the cable sheathing extending beyond the fitting into the camera head can be removed to increase the flexibility of the joint. A fabric shielding extending between the fitting and an associated connector can be used to shield the cable where the cable sheathing is removed.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
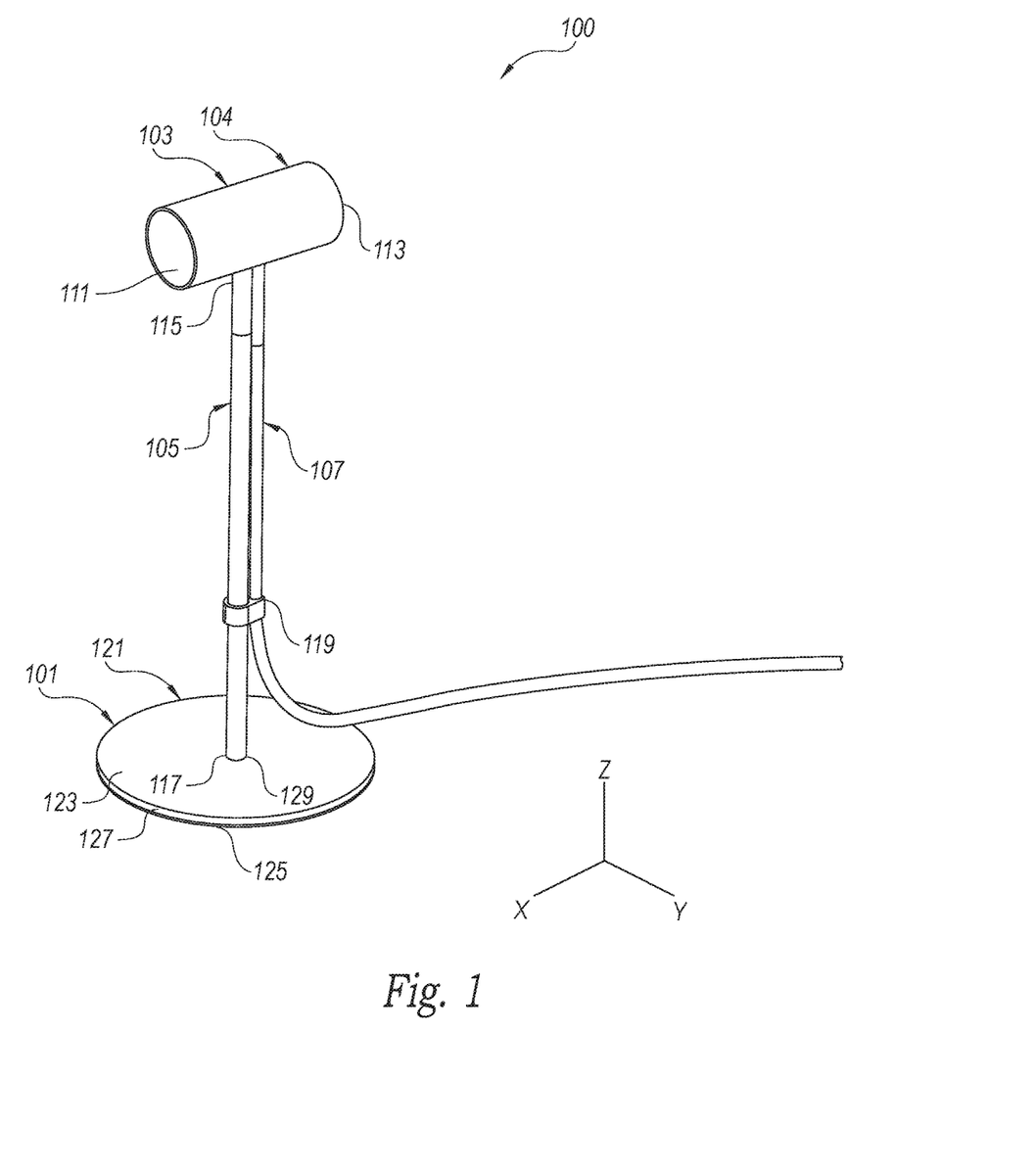
FIG. 1 is an isometric view of a tracking camera assembly in accordance with an embodiment of the present technology.

FIG. 1 is an isometric view of a tracking camera assembly 100 in accordance with an embodiment of the present technology. The assembly 100 is configured for use with a virtual reality system wherein the tracker camera is configured to track movement of selected components of the virtual reality system, such as head mounted displays, handheld controller, etc. The assembly 100 includes the stand base 101, a camera head 103, and a stand pole 105 extending between the stand base 101 and the camera head 103. An electrical and/or communication cable 107 extends away from the camera head 103 and along the stand pole 105 for a portion of its length. For purposes of providing a frame of reference for the following description, the stand pole 105 of the illustrated embodiment is substantially parallel to a Y-axis of orthogonal X-Y-Z axes of a Cartesian coordinate system.

The camera head 103 includes a substantially cylindrical member 109 having a first end 111 and a second end 113. The camera head 103 can include optics and associated camera electronics to allow the camera head 103 to capture images viewed through the optics adjacent to the first end 111, as described in more detail below. The cable 107 is connected to and is in electrical communication with the camera electronics within the camera head 103 for providing control and/or data communication. The camera head 103 can be configured to move with respect to the stand pole 105 with at least one degree of freedom. For example, in some embodiments the camera head 103 can pivot or rotate about the Y-axis, thereby obtaining varying fields of view depending on the arrangement and position of the camera head 103 with respect to the stand pole 105. Additionally, in some embodiments the stand pole 105 can rotate about the Z-axis with respect to the stand base, thereby allowing additional variation in the field of view captured by the camera head 103.

The stand pole 105 is an elongate rod having a first end 115 coupled to the camera head 103 and a second end 117 removably coupled to the stand base 101. A clamp 119 can secure the cable 107 to the stand pole 105. The clamp 119 can be configured to slide axially along the length of the stand pole 105 to retain the cable 107 at a desired position along the stand pole 105, such that a segment of the cable 107 between the clamp 119 and the cameral head 103 is substantially parallel to the stand pole 105.

The stand base 101 includes a cylindrical or disc-shaped body 121 having an upper surface 123, a lower surface 125, and a side surface 127 extending between the upper surface 123 and the lower surface 125. An axial bore 129 is formed in the upper surface 123 of the stand base 101. The second end 117 of the stand pole 105 is configured to removably and securely fit in the axial bore 129 of the stand base 101. In some embodiments, the axial bore 129 and the stand pole's second end 117 can be threaded such that the stand pole 105 screws into the stand base 101. In other embodiments, the axial bore 129 and the second end 117 of the stand pole 105 can be dimensioned so that the second end 117 is received within the axial bore 129 via a friction fit.

Figure 2A:
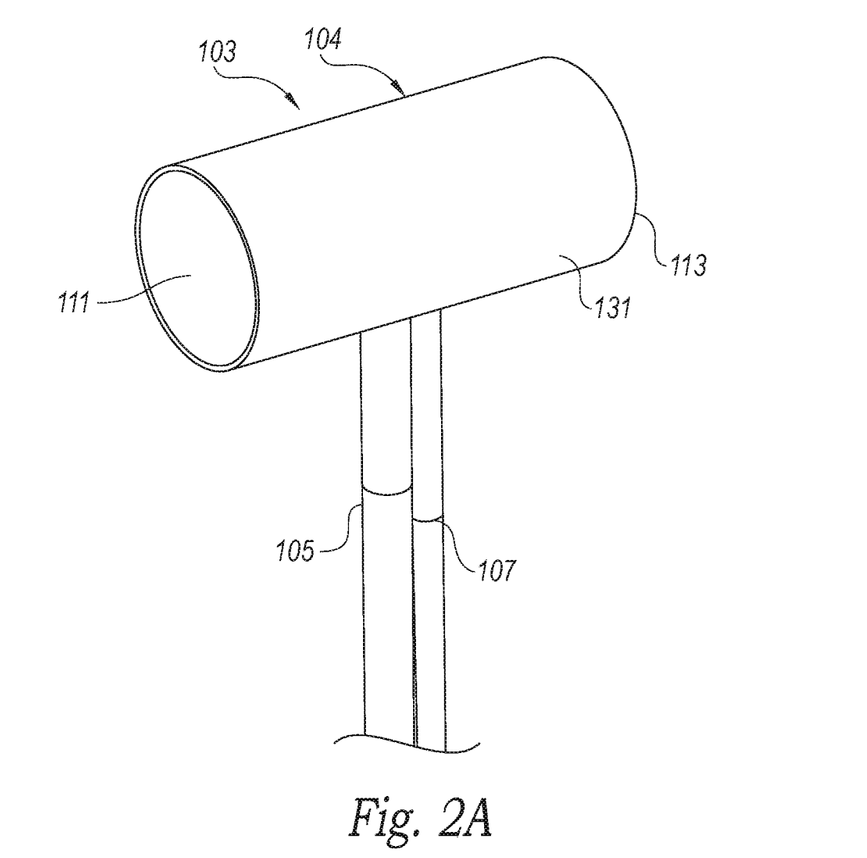
FIG. 2A is an isometric view of a camera head of the assembly shown in FIG. 1.
Figure 2B:
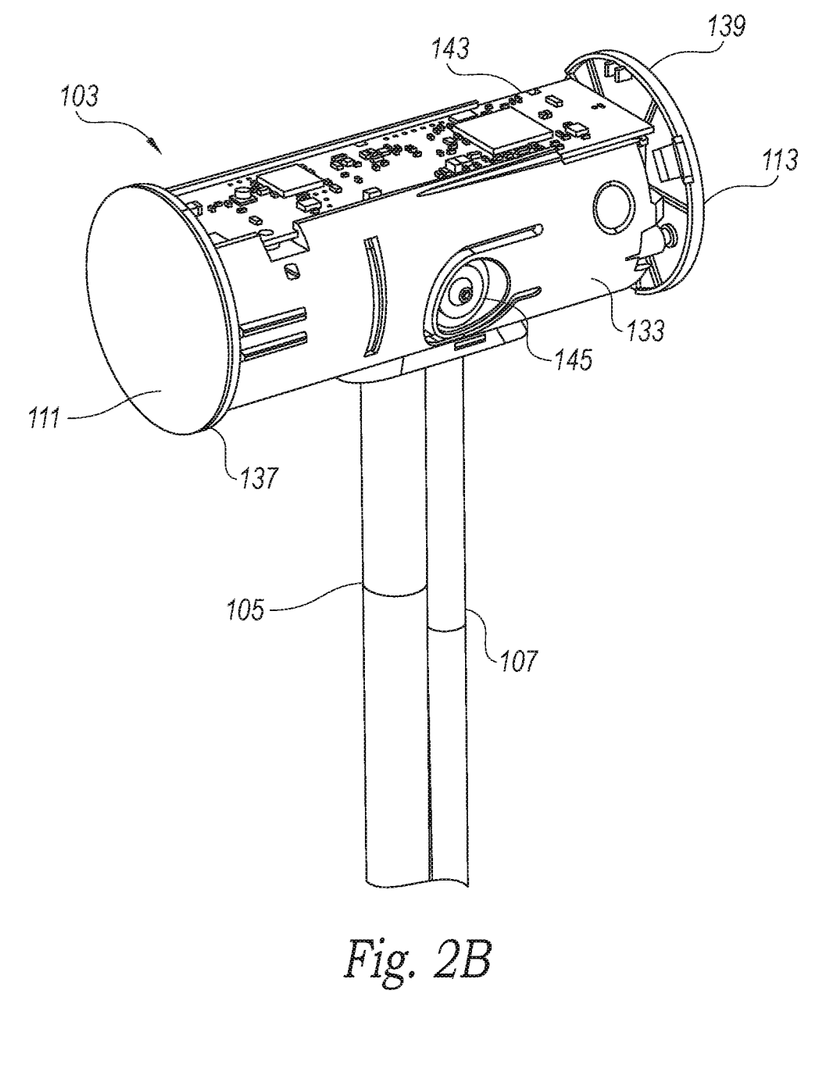
FIG. 2B is an isometric view of the camera head of FIG. 2A with the outer housing removed.
Figure 2C:
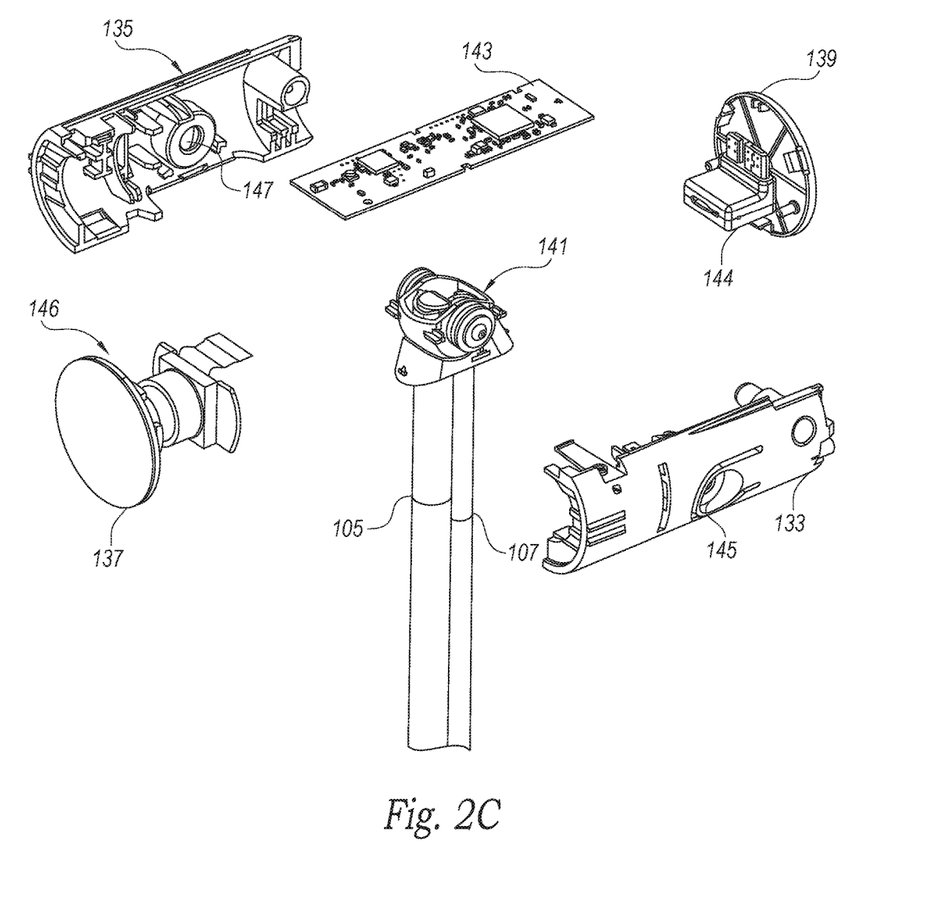
FIG. 2C is an isometric, exploded view of the camera head of FIG. 2B.
Figure 2D:
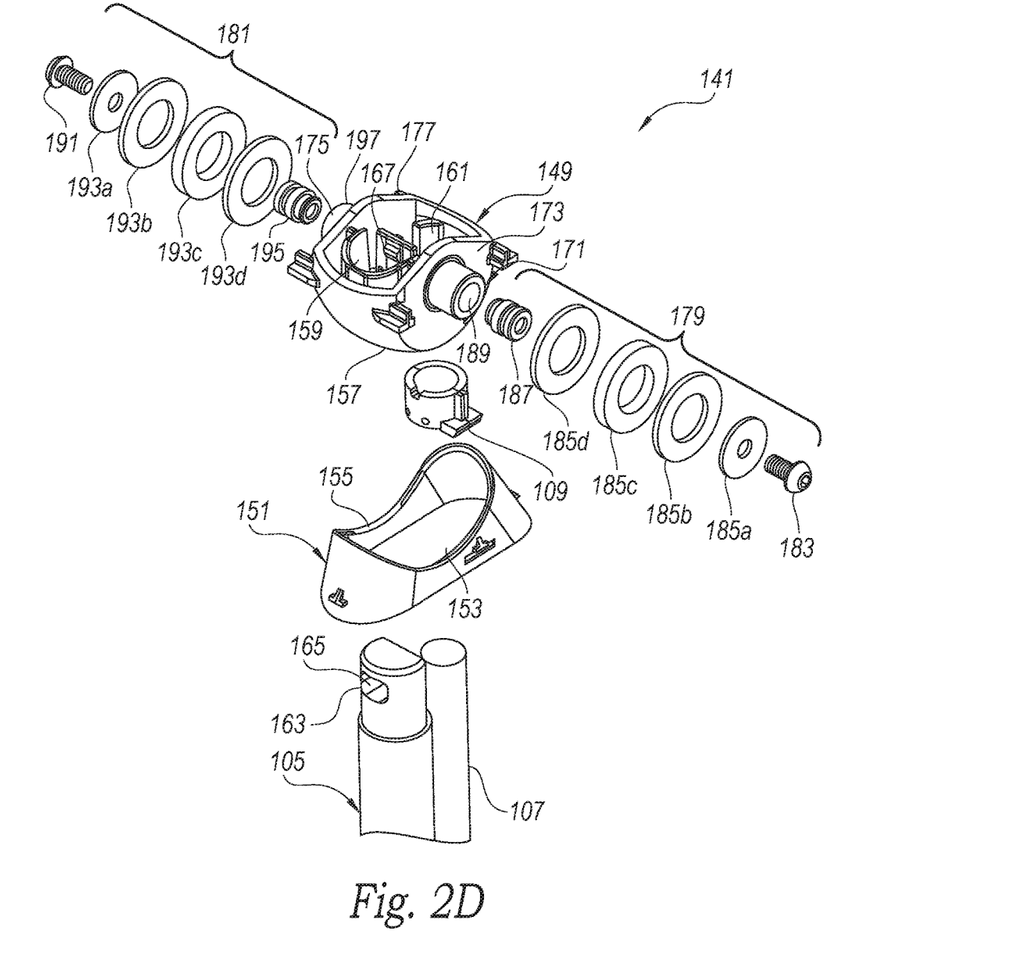
FIG. 2D is an isometric, exploded view of the pivot joint assembly of the camera head of FIGS. 2B-2D.

FIG. 2A is an isometric view of the camera head 103 of the assembly 100 shown in FIG. 1. FIG. 2B shows the camera head 103 with the housing 131 removed, FIG. 2C shows a partially exploded, isometric view of the camera head 103, and FIG. 2D shows an exploded, isometric view of the pivot mechanism of the camera head 103. Referring to FIGS. 2A-2D together, the camera head 103 comprises a substantially cylindrical, hollow outer housing 131 (FIG. 2A). The housing 131 is not shown in FIGS. 2B-2D for purposes of illustration and to avoid obscuring features within the housing.

The camera head 103 comprises a left body portion 133 and a right body portion 135 positioned opposite the left body portion 133. A front cover 137 is adjacent the first end 111 and a rear cover 139 is adjacent the second end 113. When assembled, the left body portion 133, right body portion 135, front cover 137, and rear cover 139 form a substantially cylindrical shape that encases a pivot joint assembly 141. The pivot joint assembly 141 enables the camera head 103 to pivot with respect to the stand pole 105 and the cable 107. An electronics assembly 143 contained in the body is disposed over the pivot joint assembly 141 and is also coupled to and supported by the left body portion 133, the right body portion 135, the front cover 137, and/or the rear cover 139. The electronics assembly 143 can include electronic components for controlling image capture, data transmission, image processing, and other associated processes performed by the camera assembly 100. In the illustrated embodiment, the electronics assembly 143 includes a printed circuit board with a plurality of discrete modules disposed thereon, however in other embodiments the electronics assembly 143 can take other forms.

The front cover 137 is coupled to an optics assembly 146. The optics assembly 146 can include, for example, includes lenses, filters, and one or more associated image sensors. The rear cover 139 is coupled to an electrical connector 144. As described in more detail below with respect to FIGS. 3A-3D, the cable 107 can be directly or indirectly connected to the electrical connector 144, which can in turn be electrically connected to the electronics assembly 143. In FIGS. 2B-2D, the cable 107 is truncated for simplicity.

The left body portion 133 and the right body portion 135 couple to the pivot joint assembly 141. In particular, the left body portion 133 includes a first aperture 145 and the right body portion 135 includes an second aperture 147. The first and second apertures 145, 147 each engage the pivot joint assembly 141 while the left body portion 133 and right body portion 135 are fixed together via a separate fastener (not shown). When joined together and coupled to the pivot joint assembly 141, the left body portion 133 and right body portion 135 remain fixed with respect to one another while able to pivot with respect to the stand pole 105 and the cable 107.

FIG. 2D illustrates an exploded view of the pivot joint assembly 141 in relation to the stand pole 105 and the cable 107. The pivot joint assembly 141 includes a pivot base 151 that is configured to receive and pivot with respect to a pivot joint fitting 149. The pivot base 151 defines an opening 153 through which the stand pole 105 and cable 107 can extend. The top surface 155 of the pivot base 151 provides a support against which the lower surface 157 of the fitting 149 can rotate. The pivot base 151 mates with the left body portion 133 and the right body portion 135 such that, when assembled, the positions of the left and right body portions 133, 135 are fixed with respect to the pivot base 151. The left body portion 133, right body portion 135, and pivot base 151 rotate together in unison with respect to the pivot joint fitting 149.

Figure 3A:
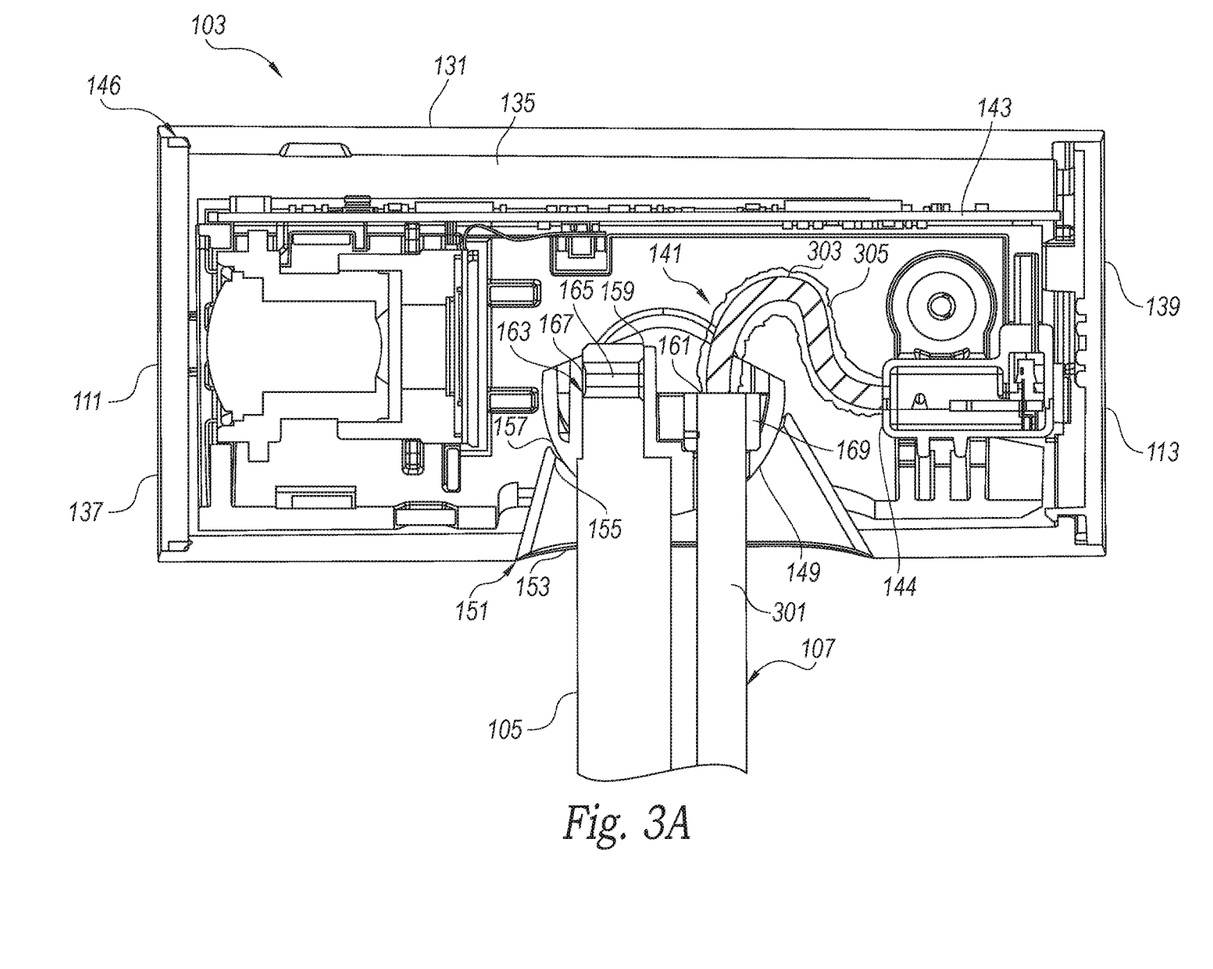
FIG. 3A is a side cross-sectional view of the camera head in accordance with an embodiment of the present technology.
Figure 3B:
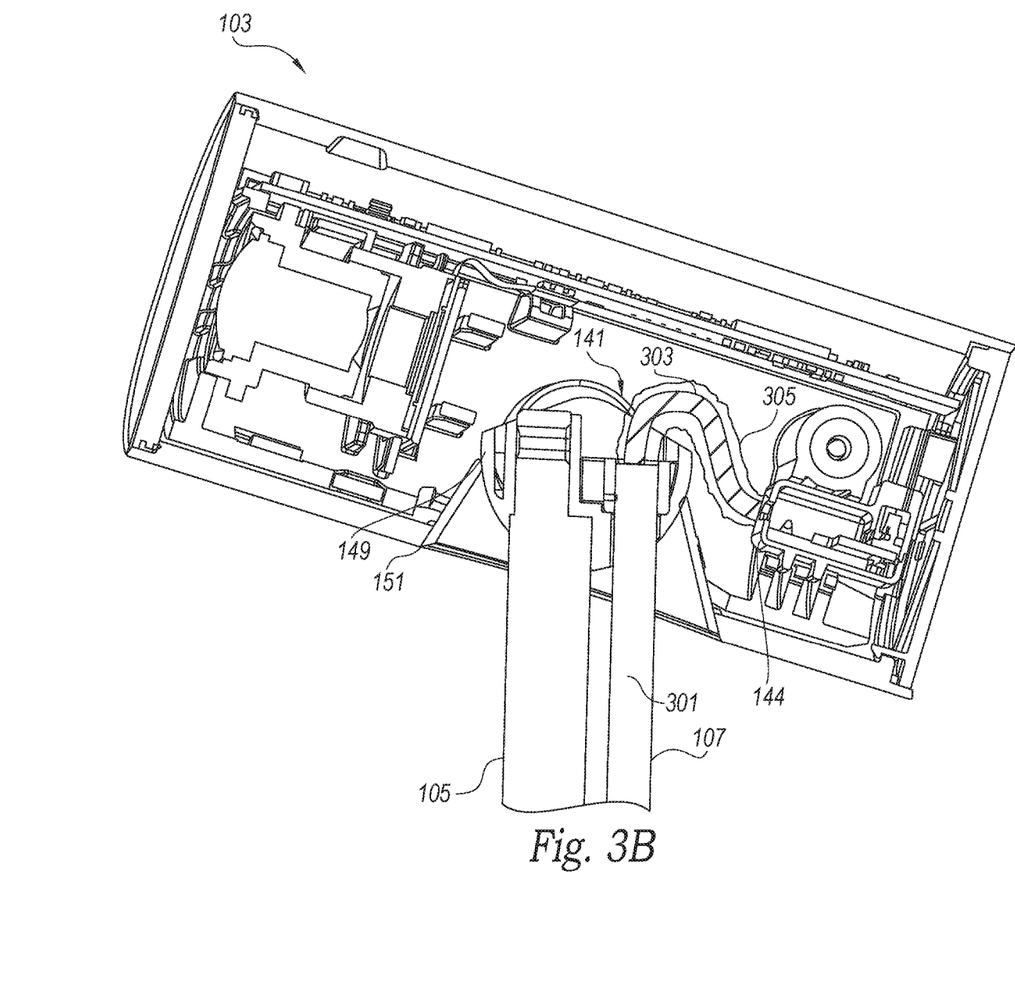
FIG. 3B is a side cross-sectional view of the camera head of FIG. 3A in an upwardly tilted configuration.
Figure 3C:
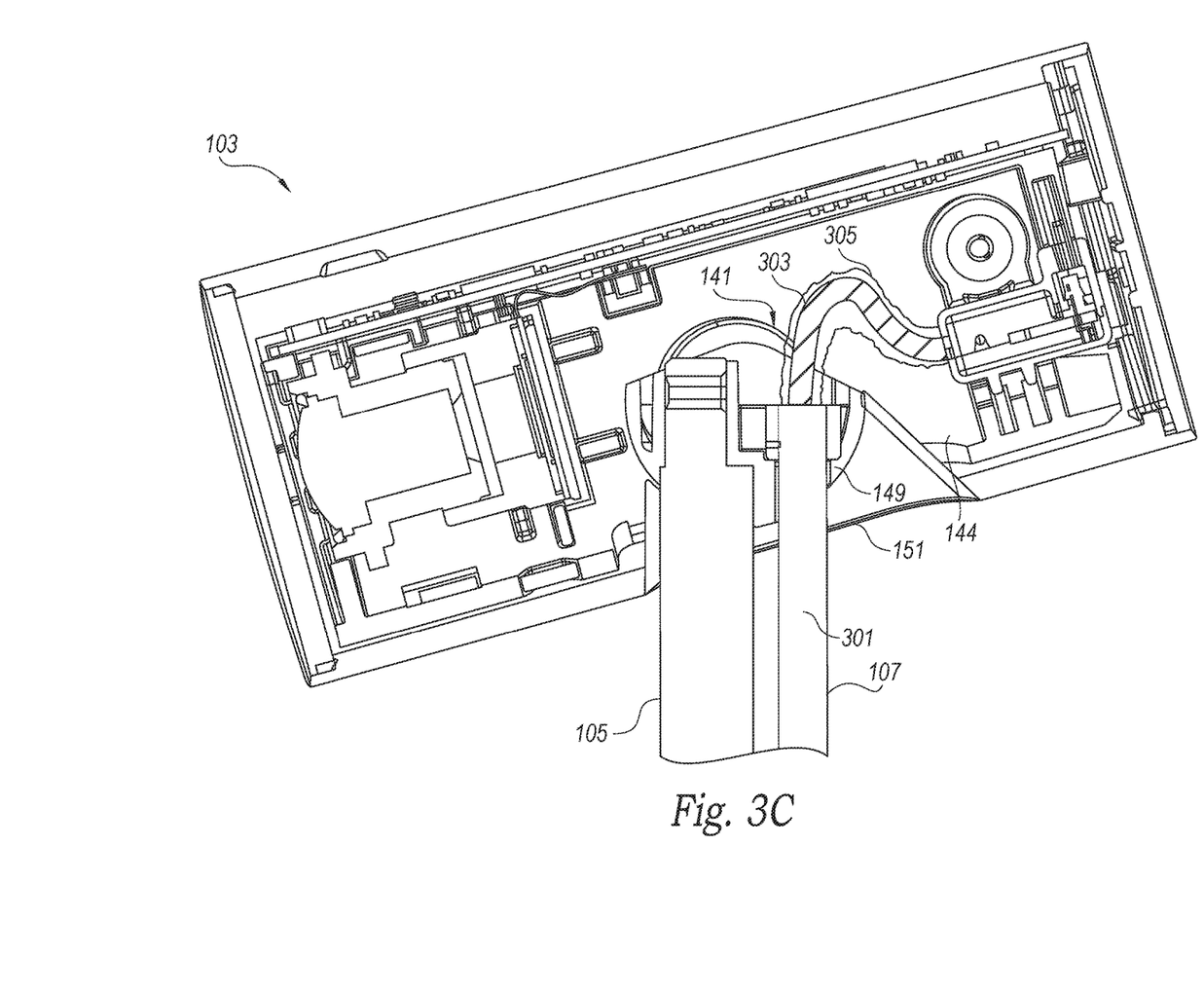
FIG. 3C is a side cross-sectional view of the camera head of FIG. 3A in a downwardly tilted configuration.

The fitting 149 has a generally semi-cylindrical lower surface 157, in which a first bore 159 and a second bore 161 are formed. The first bore 159 can be a blind bore configured to receive an end portion 163 of the stand pole 105 therein. The end portion 163 of the stand pole can include a detent 165 configured to engage with the retention mechanism 167 of the first bore 159. When mating the stand pole 105 with the fitting 149, the end portion 163 of the stand pole can be advanced into the first bore 159 until the detent 165 engages with the retention mechanism 167. Once the detent 165 is engaged with the retention mechanism 167, the stand pole 105 is fixed with respect to the fitting 149 and provides a support for the entire camera head 103. The second bore 161 can be a through bore configured to receive the cable 107 therethrough. A cable clamp 169 is sized and configured to be received within the second bore 161, and surrounds a portion of the cable 107 to secure its position with respect to the second bore 161. Once secured by the cable clamp 169, the cable 107 is fixed with respect to the fitting 149 even as the fitting 149 rotates with respect to the pivot base 151. As noted above, the cable 107 is truncated for simplicity in this drawing. In operation, the cable 107 extends through the second bore 161 and into the interior of the camera head 103, as illustrated in FIGS. 3A-3C.

A first shaft 171 extends from a first side surface 173 of the fitting 149. A second shaft 175 coaxially aligned with the first shaft 171 extends from a second, opposite side surface 177 of the fitting 149. The first shaft 171 is received within the first aperture 145 of the left body portion 133 and the second shaft 175 is received within the second aperture 147 of the right body portion 135.

The left body portion 133 is secured to the first shaft 171 by a first fastener assembly 179, and similarly the right body portion 135 is secured to the second shaft 175 by a second fastener assembly 181. The first fastener assembly 179 includes a first fastener 183, a plurality of washers 185a-d, and a bearing 187, which is sized and configured to be received within a first socket 189 of the first shaft 171. When assembled with the housing, the first and second washers 185a, 185b can be disposed on an outer side of the first aperture 145 of the left body portion 133, while the third and fourth washers 185c, 185d can be disposed on an inner side of the first aperture 145 of the left body portion 133. The first fastener 183 can be, for example, a threaded screw and can be configured to threadably engage with corresponding threads within the bearing 187. The bearing 187 is disposed within the first socket 189 of the first shaft 171 and is configured to rotate within the first socket 189. The first fastener assembly 179 fixes the position of the left body portion 133 with respect to the bearing 187. As noted above, the left body portion 133 is also fixedly coupled to the pivot base 151. As a result of this configuration, the fitting 149 can rotate with respect to the pivot base 151 and the left body portion 133.

The second fastener assembly 181 is configured similarly to the first fastener assembly 179. For example, the second fastener assembly 181 includes a second fastener 191, a plurality of washers 193a-d, and a second bearing 195 configured to be received within a second socket 197 of the second shaft 175. The second fastener assembly 181 secures the right body portion 135 to the fitting 149. When assembled with the housing, the first and second washers 193a, 193b can be disposed on an outer side of the second aperture 147 of the right body portion 135, while the third and fourth washers 193c, 193d can be disposed on an inner side of the second aperture 147 of the right body portion 135. The second fastener 191 can be a threaded screw configured to threadably engage with corresponding threads within the second bearing 195. The second bearing 195 is disposed within the second socket 197 of the second shaft 175 and is configured to rotate within the second socket 197. The second fastener assembly 181 fixes the position of the right body portion 135 with respect to the second bearing 195 and the right body portion 135 is also secured to the pivot base 151, as noted above. In this configuration, the pivot base 151 and the right body portion 135 can pivot with respect to the fitting 149. The cradled, slidable arrangement between the pivot base 151 and the fitting 149, and the stable, pivotable engagement between the first and second fastener assemblies 179 and 181 and the respective left and right body portions 131 and 135 provide a very smooth and consistent feel and frictional engagement for easy and accurate pivotal adjustment of the camera head 103 relative to the stand pole 105.

FIGS. 3A-3C are side cross-sectional views of the camera head 103 in various configurations of tilt. The cable 107 extends through the second bore 161 of the fitting 149. The cable 107 can include a first portion 301 which extends downwardly from the second bore 161 and the cable clamp 169 and a second portion 303 which extends upwardly from the cable clamp 169 and is connected to the electrical connector 144. The first portion 301 of the cable 107 can include a cable sheathing, for example a cable sheathing made of rubber, polyurethane, plastic, etc. The second portion 303 of the cable 107 can have the cable sheathing removed to increase flexibility of the second portion of the cable 107 within the camera head 103 as the housing pivots relative to the stand pole via the pivot joint assembly 141. The second portion 303 of the cable 107 has sufficient length to accommodate the entire range of motion of the pivot joint fitting 149 with respect to the pivot base 151 without binding or excessive bunching of the cable 107. As illustrated in FIGS. 3A-3C, as the camera head 103 rotates with respect to the stand pole 105, the second portion 303 of the cable 107 flexes and moves to accommodate the changing positions with minimum resistance. In some embodiments, a flexible fabric material 305 can be disposed around the second portion 303 of the cable 107, thereby providing some protection for the wires within the second portion 303 of the cable 107 without significantly reducing flexibility. In some embodiments, the flexible fabric material 305 is not used.

As illustrated in FIGS. 3A-3C, the camera head 103 rotates with respect to the fitting 149 of the pivot joint assembly 141, which in turn is fixedly coupled to the stand pole 105 and the cable 107. Accordingly, the camera head 103 rotates with respect to the stand pole 105, which in turn is fixed to a stand base (FIG. 1), thereby allowing the camera head 103 to move with at least one degree of freedom to capture different fields of view. The range of motion of the camera head 103 can be defined by the opening 153 of the pivot base 151 against which the fitting 149 can move.

Figure 4:
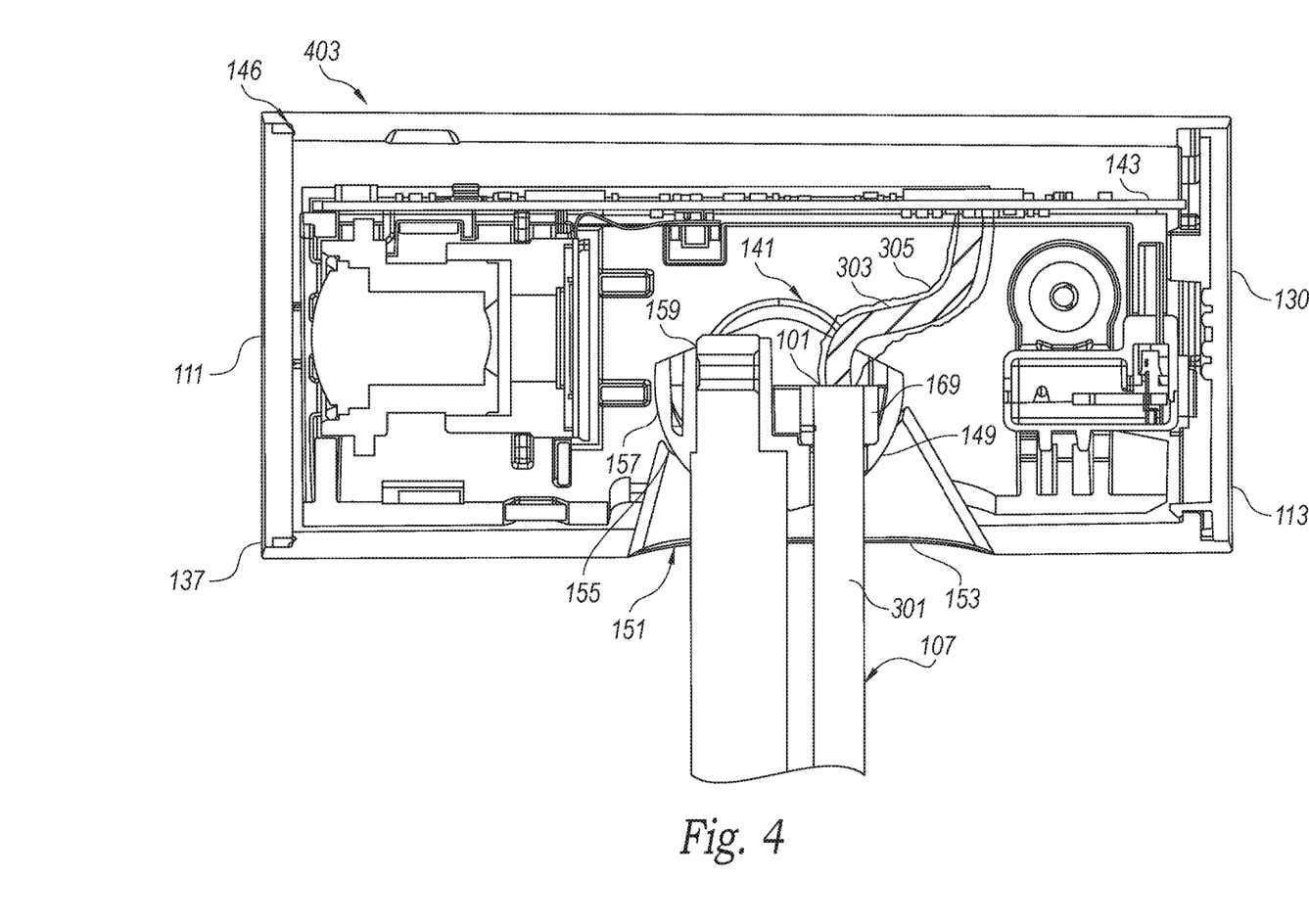
FIG. 4 is a side cross-sectional views of a camera head in accordance with another embodiment of the present technology.

FIG. 4 is a side cross-sectional view of a camera head 403 in accordance with another embodiment of the present technology. The camera head 403 can be at least generally similar to the camera head 103 of FIGS. 1-3C, except that the second portion 303 of the cable 107 is coupled directly to the electronics assembly 143, rather than to the electrical connector 144. As the camera head 403 rotates with respect to the stand pole 105, the second portion 303 of the cable 107 flexes and moves to accommodate the changing positions while remaining fixed at one end to the cable clamp 169 and at the other end to the electronics assembly 143. In other embodiments, the cable 107 can be electrically connected to a corresponding electronic connector at any position within the camera head 103.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A virtual reality tracking camera assembly comprising:
 a tracker camera configured for use with a virtual reality system and to track movement of components of the virtual reality system, the tracker camera having a camera head comprising:
  an electronics assembly configured for controlling image capture, data transmission, and image processing;
  a housing containing the electronics assembly; and
 a pivot joint fitting disposed within the housing, the pivot joint fitting configured to rotate with respect to the housing, wherein the pivot joint fitting comprises:
  a pivot base; and
  a body having a semi-cylindrical lower surface configured to engage the pivot base against which the pivot joint fitting rotates;
 a cable in electrical communication with the electronics assembly in the housing, the cable fixedly coupled to the pivot joint fitting and extending away from the camera head;
 a stand pole fixedly coupled to the body of the pivot joint fitting and extending away from the camera head; and
 a stand base configured to receive the stand pole, the stand base comprising:
  a cylindrical body having an upper surface, a lower surface, and a side surface, the cylindrical body defining an axis extending between the upper surface and the lower surface; and
  an axial bore formed in the top surface of the cylindrical body and extending substantially parallel to the axis, the axial bore configured to removably receive a portion of the stand pole therein.

2. The virtual reality tracking camera assembly of claim 1 wherein the stand pole comprises a threaded end portion.

3. The virtual reality tracking camera assembly of claim 1 wherein the axial bore is configured to removably receive a portion of the stand pole therein via friction fit.

4. The virtual reality tracking camera assembly of claim 1 wherein the stand pole is configured to rotate with respect to the stand base when received within the axial bore.

5. The virtual reality tracking camera assembly of claim 1, further comprising a cable clamp coupled to the pivot joint fitting and configured to retain the cable with respect to the pivot joint fitting.

6. The virtual reality tracking camera assembly of claim 1 wherein the pivot joint fitting comprises a bore configured to receive the stand pole therein.

7. The virtual reality tracking camera assembly of claim 1 wherein the pivot joint fitting further comprises:
 a first bore formed in the lower surface that receives the stand pole;
 a second bore formed in the lower surface that receives the cable; and
 a shaft extending away from a side surface of the body, the shaft having a socket that receives a bearing therein.

8. The virtual reality tracking camera assembly of claim 7 wherein the housing comprises a side portion having an aperture that receives the shaft of the pivot joint fitting,
 wherein the side portion is rotatably coupled to the shaft via a fastener engaged with the bearing.

9. A virtual reality tracking camera assembly comprising:
 a camera head configured for use with a virtual reality system, the camera head comprising a housing;
 a joint fitting pivotably coupled to the housing, wherein the joint fitting comprises:
  a pivot base; and
  a body having a curved lower surface configured to engage the pivot base against which the joint fitting rotates;
 an electrical cable fixedly coupled to the joint fitting and extending away from the camera head;
 a stand pole fixedly coupled to the body of the joint fitting and extending away from the camera head; and
 a stand base configured to receive the stand pole, the stand base comprising:
  an upper surface, a lower surface, and a side surface extending between the upper surface and the lower surface; and
  a first bore formed in the upper surface and configured to removably receive a portion of the stand pole therein,
 wherein the housing is configured to rotate with respect to the joint fitting, the electrical cable, and the stand pole.

10. The virtual reality tracking camera assembly of claim 9 wherein the support member comprises a threaded end portion, and wherein the first bore is threaded and configured to mate with the threaded end portion of the support member.

11. The virtual reality tracking camera assembly of claim 9 wherein the first bore is configured to removably receive a portion of the support member therein via friction fit.

12. The virtual reality tracking camera assembly of claim 9 wherein the stand pole is configured to rotate with respect to the stand base when received within the first bore.

13. The virtual reality tracking camera assembly of claim 9, wherein the electrical cable is fixedly coupled to the joint fitting via a cable clamp.

14. The virtual reality tracking camera assembly of claim 9 wherein the joint fitting further comprises:
 a blind bore that receives a portion of the stand pole therein; and
 a through bore that receives the electrical cable therethrough.

15. The virtual reality tracking camera assembly of claim 9 wherein the joint fitting further comprises:
 a second bore formed in the lower surface that receives a portion of the stand pole;
 a third bore formed in the lower surface that receives the cable; and
 a shaft extending away from a side surface of the body, the shaft having a socket with a bearing disposed therein,
 wherein the housing comprises a side portion having an aperture that receives the shaft of the pivot joint fitting, and
 wherein the side portion is pivotably coupled to the shaft via a fastener engaged with the bearing.

16. A method of manufacturing a virtual reality tracking camera assembly, the method comprising:
 providing a camera head configured for use with a virtual reality system, the camera head comprising a housing;

disposing a pivot joint fitting within the housing, the pivot joint fitting configured to rotate with respect to the housing, wherein the pivot joint fitting comprises:
  a pivot base; and
  a body having a semi-cylindrical lower surface configured to engage the pivot base against which the pivot joint fitting rotates;
passing an electrical cable through the pivot joint fitting and electrically connecting the electrical cable to the camera head;
engaging a first portion of a stand pole with the body of the pivot joint fitting such that the stand pole extends away from the camera head;
positioning a stand base comprising an upper surface, a lower surface, and a side surface extending between the upper surface and the lower surface, the stand base further comprising an axial bore formed in the upper surface; and
coupling a second portion of the stand pole to the stand base.

17. The method of claim 16 further comprising coupling the second portion of the stand pole to the stand base such that the stand pole can rotate with respect to the stand base.

18. The method of claim 16 wherein passing the electrical cable through the pivot joint fitting comprises fixing the electrical cable to the pivot joint fitting via a cable clamp.

19. The method of claim 16 wherein the electrical cable, the stand pole, and the pivot joint are configured to rotate together with respect to the housing.

20. The method of claim 16 wherein the pivot joint fitting further comprises:
  a shaft extending away from a side surface of the body, the shaft having a socket with a bearing disposed therein,
  wherein the housing comprises a side portion having an aperture that receives the shaft of the pivot joint fitting, and
  wherein disposing the pivot joint fitting within the housing comprises:
    disposing the aperture of the side portion of the housing over the shaft of the pivot joint fitting; and
    coupling the side portion of the housing to the shaft via a fastener engaged with the bearing.

* * * * *